United States Patent

[11] 3,585,921

[72] Inventor Farees Uddin Khaja
     Chicago, Ill.
[21] Appl. No. 797,924
[22] Filed Feb. 10, 1969
[45] Patented June 22, 1971
[73] Assignee Sunbeam Corporation
     Chicago, Ill.

[54] APPARATUS FOR BREWING COFFEE
     18 Claims, 6 Drawing Figs.
[52] U.S. Cl. .................................................. 99/280,
                                              99/285, 99/312
[51] Int. Cl. ............................................. A47j 31/053
[50] Field of Search ....................................... 99/280,
     281, 282, 283, 285, 300, 302, 303, 304, 307, 308,
                              309, 310, 311, 312, 313, 314

[56] References Cited
     UNITED STATES PATENTS
     1,995,081  3/1935  Sommers ...................... 99/281
     2,855,476  10/1958 Garrard ........................ 99/283
     3,430,232  2/1969  Martin .......................... 99/285

Primary Examiner—Robert W. Jenkins
Attorney—George R. Clark

ABSTRACT: An improved electric percolator including an electric timing arrangement for setting the percolator so that the brewing operation will commence at a selectable future time and said timing arrangement being compactly disposed within the percolator base. The particular stage of the percolator operating cycle can readily be determined by various visual indicating means that are incorporated in this appliance. Moreover, the percolator is provided with an integral plastic lens which supports a signal light and locks itself to the percolator base in a manner to cover an aperture therein.

Inventor:
Farees U. Khaja
By:
Robert W. Dudley
Atty.

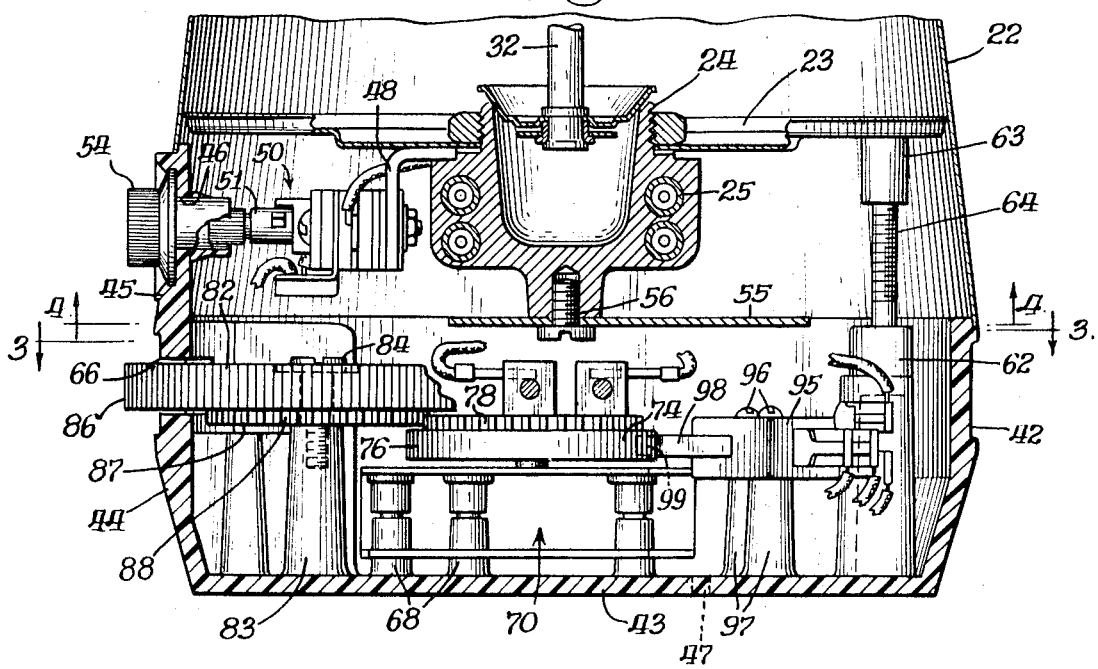

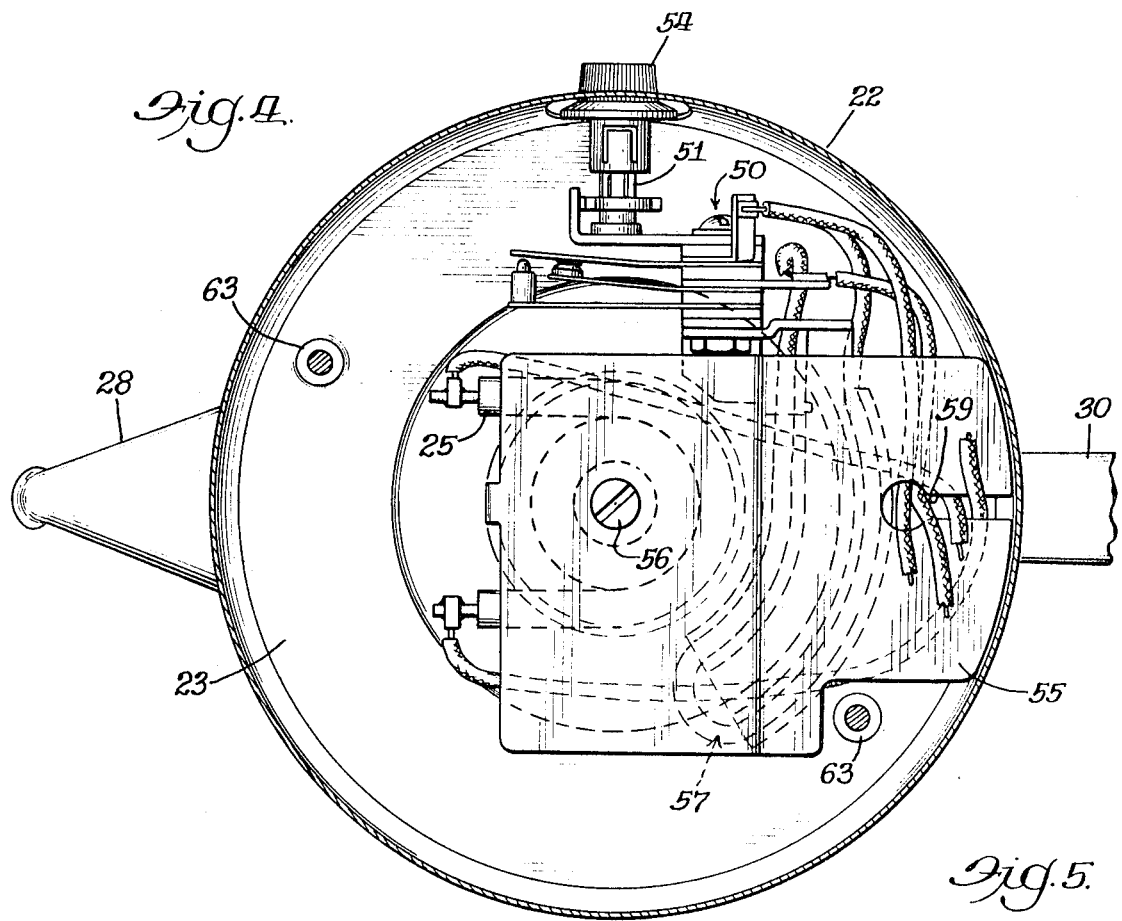
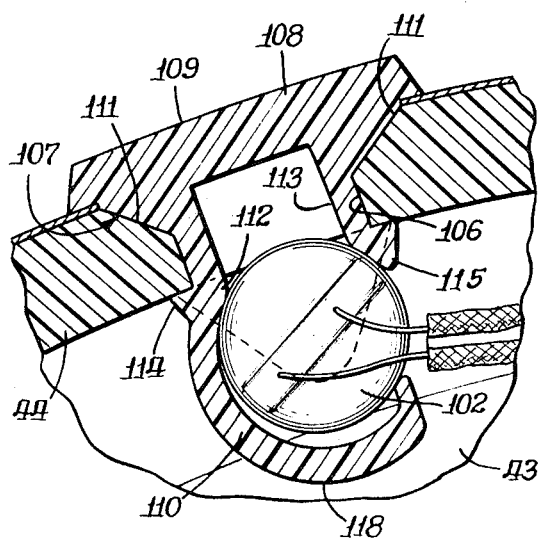
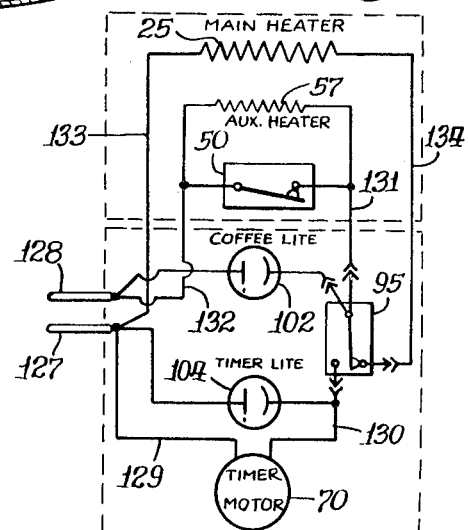
Inventor:
Farees U. Khaja
By: Robert W. Dudley
Atty.

APPARATUS FOR BREWING COFFEE

BACKGROUND OF THE INVENTION

The present invention relates to coffee makers and, more particularly, to an improved electric percolator having timing means for starting and completing the brewing operation at a selectable future time.

The prior art reveals coffee making devices which include timing means so that the user can charge the coffee maker with coffee grounds and water in the correct ratio and set the timing means to begin or even complete the brewing operation at a selectable future time. It was appreciated that there is a need for this type of device which will permit freshly brewed coffee to be ready when the user arises in the morning. Furthermore, it is advantageous to have freshly brewed hot coffee ready upon the return to the home after attending an outdoor activity in brisk weather, since coffee cannot be stored or brewed a long period prior to drinking due to its characteristic of losing its desirable flavor rapidly after being brewed. However, prior art devices are in general bulky in construction and expensive to manufacture. Accordingly, it would be highly desirable to have a coffee maker with a preset timing function which is compact and inexpensively constructed and which is simple to set for completing the brewing operation at a given future time. It is well known that timers which are commonly used with ovens are highly complicated to set because of their dependency upon correlating the timing mechanism with a clock which also indicates the correct time. Thus, a coffee maker having an internal timing feature should be simple to set and require a minimum of instructions for its use.

Since this type of coffee maker will be set to commence the brewing operation at a future time, some means should be available to indicate to the user the present state of the percolator operating cycle. By this means the user can quickly be informed if the percolator is properly connected to the electrical power source, if the timing means is operating, if the brewing operation is underway or if the brewing operation is completed. Naturally, such means should be inexpensive and be readily discernible by the user even if the user is positioned a considerable distance from the coffee maker.

In some instances, it is necessary to use a signal light in connection with the operation of an electrical appliance. Normally, the light is supported within the appliance base contiguous to an exterior wall having an aperture through which the signal illumination can pass, and a lens is located in this aperture. It would be advantageous to have a simple, inexpensive lens which firmly locks itself to the exterior wall of the appliance and effectively supports the signal light.

SUMMARY OF THE INVENTION

This invention relates to an electric percolator having an electric heater for brewing coffee and timing means for controlling the operation of the heater, both of which are enclosed by a base. Attached to the base is a control member which is accessible from outside of the base for setting the desired time period before the completion of the brewing operation, and the timing means is in connection with said control member. Positioned within the base is an electrical control switch which is in electrical connection with said heater and disposed for actuation by said timing means so that the heater can be energized at a selected time. Signal lights are included in circuit means to give a visual indication when the percolator is connected to an electrical energy source and to indicate the completion of the brewing operation. Additionally, the percolator has a cover with a transparent portion whereby the user can see if the brewing operation is underway due to the brewing pulsations which are visible through the transparent portion.

Holding the signal lights in proper position are integral lenses which have a portion to transmit illumination and another portion for holding themselves to the percolator base.

Accordingly, it is an object of the present invention to provide an improved electric percolator having means to start the brewing operation at a future selectable time and said percolator being compact and inexpensively manufactured.

Another object of the present invention is to provide an improved electric percolator having visual indicating means to disclose the particular stage at which the percolator is in its cycle.

Still another object of the present invention is to provide an electrical appliance having a simple signal light lens which locks itself to the appliance wall and supports a signal light.

A further object of the present invention is to provide a percolator with a time control means which is simply set and easily understood.

Further objects and advantages of the present invention will become apparent as the following description proceeds and the features of novelty which characterize the invention will be pointed out with particularity in the claims annexed to and forming a part of this specification.

BRIEF DESCRIPTION OF THE DRAWING

For a better understanding of the present invention, reference may be had to the accompanying drawing in which:

FIG. 2 is a fragmentary sectional view taken substantially along line 2-2 of FIG. 1 assuming that FIG. 1 illustrates the complete percolator;

FIG. 3 is a sectional view taken substantially along line 3-3 of FIG. 2 with the lead wires broken away for clarity of illustration and assuming that FIG. 2 discloses a complete apparatus;

FIG. 4 is a sectional view taken substantially along line 4-4 of FIG. 2 with the base removed;

FIG. 5 is a schematic wiring diagram illustrating the electric circuit for the percolator; and FIG. 6 depicts the interlocking of the signal light lens and the percolator base.

DESCRIPTION OF THE PREFERRED EMBODIMENT

Figure 1:
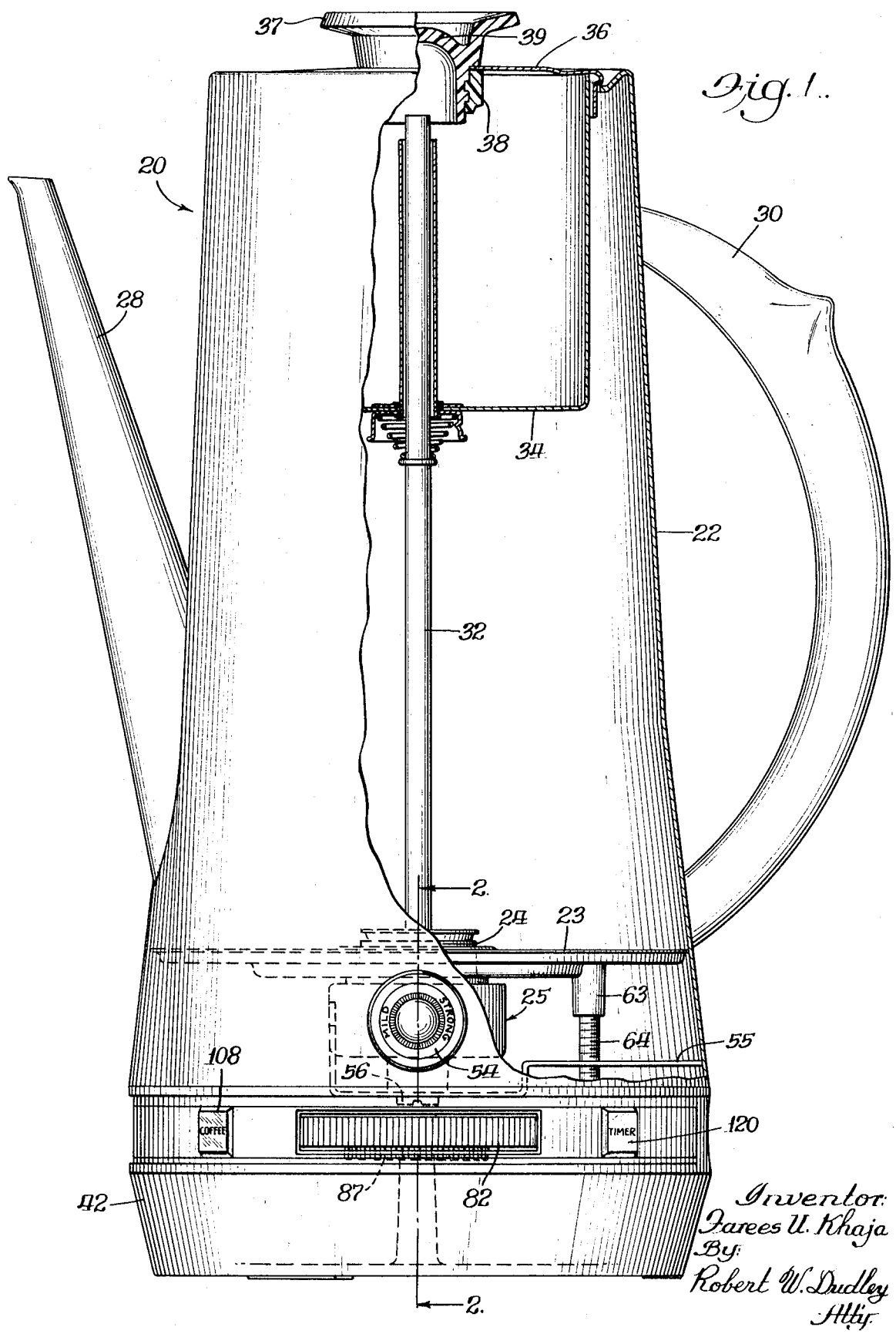
FIG. 1 is a front elevational view with a portion thereof cut away to reveal the internal construction of an electric percolator embodying the present invention.

Referring now to the drawing, there is illustrated in FIG. 1 an electric percolator generally indicated by reference numeral 20 comprising a somewhat conically-shaped sheet metal casing or vessel 22 having a horizontally disposed wall 23 spaced above the bottom thereof to which is secured a die cast pump well 24 with an embedded electric resistance heater 25. In order to pour coffee from the vessel 22 it is provided with a pouring spout 28 which is angled upwardly. To facilitate the transportation of the percolator and pouring of coffee through the spout 28, C-shaped plastic handle 30 is attached to the vessel 22. Mounted within the vessel 22 is a vertically extending fountain or delivery tube 32 at the upper end of which is supported a basket 34 for receiving and retaining coffee grounds. The bottom end of the tube 32 rests on and is in fluid communication with the pump well 24. As thus far described, the percolator is of standard construction and its operation is well understood by those skilled in the art.

Enclosing the top of the vessel 22 is a cover 36 having a transparent knob 37 which is sometimes referred to as a bubbler. The centrally disposed transparent knob 37 is rigidly attached to the cover 36 by means of a suitable locking nut 38. Preferably, the knob 37 is molded of plastic material which is transparent after it has been molded and is formed with an upwardly extending dome portion 39. As is readily understood, coffee is brewed in the percolator 20 by adding water to the vessel 22 and adding the appropriate quantity of coffee grounds to the basket 34. Upon the supplying of electrical power to the heater 25 the water which enters into the pump well 24 is forced upwardly through the delivery tube 32 with sufficient velocity so that it impacts against the knob dome portion 39 before falling onto the coffee grounds in basket 34.

After the water has seeped through the coffee grounds it flows through a plurality of suitable openings in the basket 34. The origin of the descriptive term bubbler which is sometimes used in connection with the knob 37 is readily apparent because the pulsating gushing of water into the knob dome portion 39 produces an outwardly visible bubbling effect. It should be appreciated that the same bubbling effect can be obtained if the knob 37 is made from a translucent rather than a transparent material.

Disposed below and attached to the vessel 22 is a cup-shaped plastic base 42 having a relatively flat bottom wall 43 and a peripheral annular sidewall 44 including an upright projection 45 defining a central horizontally extending opening 46. A drain opening 47 is defined in the bottom wall 43 for permitting liquid which might enter the base 42 to flow out thereof through this opening. As can be conveniently seen in FIG. 2, an L-shaped heat conducting bracket 48 is attached, such as by welding, to the underside of vessel bottom wall 23, and attached to this bracket is an electric thermostatic switch 50 having a temperature adjusting shaft 51 extending horizontally toward and in alignment with base projection opening 46. The construction and operation of the thermostatic switch 50 are conventional in the percolator art, and, consequently, a detailed description thereof is not required. Suffice it to say, the thermostatic switch senses the temperature of the vessel bottom wall 23 which is approximately the same temperature as the coffee contained within the vessel so that when the coffee reaches a given temperature which temperature can be set by the angular displacement of shaft 51, the thermostatic switch will open. In order to permit the user to readily set the thermostatic switch shaft 51, a temperature control knob 54 which is commonly referred to as a strength control is rotatably supported by the base 42 in the upright projection opening 46 and is in driving engagement with said shaft. Therefore, the angular displacement of the knob 54 controls the coffee temperature at which the switch 50 opens. Since the switch 50 is in electrical connection with the heater 25, the opening of the switch terminates the pumping action of well 24, which in turn terminates the brewing operation.

As can be seen in FIG. 4, a barrier or heat shield 55 extends horizontally below the pump well 24 containing the electric heater 25 and below an auxiliary heater 56 which is contiguous to the vessel bottom wall 23. The shield 55 is held in position by a screw 56 which locks the shield to the bottom of the heat pump well 24. The primary purpose of the shield 55 is to reduce the transmission of heat from the heaters to those components which are disposed below the shield. Additionally, the shield 55 is formed with a key-shaped opening 59 through which passes a plurality of electrical lead wires thereby preventing the wires from interfering with any component of the subject percolator.

Turning our attention to the plastic base 42, it may be seen in FIG. 2 that the base is molded with upwardly extending mounting wells 62 which are in alignment with threaded studs 63 depending from the bottom of vessel wall 23 whereby screws 64 which pass between the base wells 63 and studs 63 rigidly lock the base 42 to the vessel 22. The base 42 is molded with a horizontally extending slot 66 in sidewall 44 and a plurality of projections 68 extending upwardly from base bottom wall 43 to which is attached an electrically operated timing movement 70 so that said movement is spaced above the base bottom wall 43. The detailed construction of the timing movement 70 is not pertinent to the present invention but preferably the movement is the same as the compact clock movement disclosed in Jepson et al. Pat. No. 3,248,867 which is assigned to the same assignee as is the present application. Extending upwardly from the timing movement 70 is a vertical drive shaft 72 which rotates at a constant speed of one revolution per 12 hours when the movement is energized. Secured to the timing movement drive shaft 72 is a horizontally disposed intermediate member 74. The member 72 has a peripheral portion 76 which lies on a given radius from the drive shaft 72 and is interrupted by a single inwardly directed cam notched portion 77. Located above the peripheral portion 76 there is formed an integral gear portion 78 having a plurality of gear teeth 79. A wheel-shaped time setting control member 82, preferably formed of an electrically nonconducting plastic, is rotatably mounted to an upwardly extending post 83 which is integrally formed with the base 42. Positioning and holding the member 82 to the post 83 is a suitable shoulder-type screw 84 which permits the member to freely rotate. As can be best seen in FIGS. 2 and 3, the time setting control member 82 has a serrated periphery 86 and a bottom gear portion 87 having a plurality of gear teeth 88 which are in driven relationship with the intermediate gear teeth 79. Inasmuch as the same number of teeth are formed on the member 82 as on the member 74 both members rotate at the same speed. The member 82 is located with respect to the base slot 66 so that a portion thereof protrudes through the slot to a position exterior of the base. Imprinted on the member 82 near its periphery 86 is indicia 90 including the word "set," numbers from zero to 11 and two dots with a vertical line positioned therebetween disposed between each number except for between zero and one where there are only two dots. When the control member 82 is rotated due to the energization of timing movement 70 it takes approximately 15 minutes to rotate the member through an angle equal to the distance between any adjacent dot, line or number.

According to the present invention a single-pole double-throw electric contact switch 95 is mounted by means of two screws 96 to a pair of bosses 97 which are integrally formed with and extend upwardly from the base bottom wall 43. Once locked in position, the switch 95 is spaced upwardly from the bottom wall 43 and is adjacent to the timing movement 70. As shown in FIG. 3 the switch 95 has a pivotal lever 98 at the remote end of which is a curved contact portion 99 disposed to engage with either the intermediate peripheral portion 76 or cam notched portion 77. The pivotal movement of lever 98 actuates through plunger 100 the switch 95 so that when the lever contact portion 99 is in engagement with the intermediate peripheral portion 76 the switch permits electrical power to reach the movement 70 and when the lever pivots outwardly so that the lever contact portion falls into intermediate cam notched portion 77 the switch is open with respect to the movement, as will be explained hereinafter. Thus, it should be appreciated that the rotation of the time setting control member 82 will correspondingly angularly relate the intermediate cam notched portion 77 with respect to the switch lever contact portion 99. Furthermore, the rotation of the intermediate member 74 by the timing movement 70 can bring notched portion 77 into engagement with the lever contact portion 99.

For the purpose of providing a visual indicating means to reveal the stage at which the percolator is operating, the base 42 is provided with a "coffee light" 102 disposed laterally of the control member 82 and a timer light 104 positioned on the opposite side of said member. To facilitate the controlling of the subject percolator the controls are located in close proximity to each other with the temperature control knob 54 being located immediately above the time setting control member 82 and the lights 102 and 104 positioned on opposite sides of the member 82. Both lights 102 and 104 are attached to the base 42 in the same manner, and, therefore, a description of how one is attached should suffice. Referring to FIG. 6 it may be seen that the base sidewall 44 defines a square-shaped opening 106 having side outwardly facing chamfers 107. A lens 108 which is preferably molded from a plastic which is translucent has a window portion 109 which is adapted to overlie the opening 106 and an inwardly extending light receiving portion 110 including angular section 111 which are complementary to and disposed to engage with chamfers 107, inwardly extending spaced arms 112 and 113 having laterally extending protuberances 114 and 115, respectively, which, due to the resiliency of arms 112 and 113, snap behind the inside surface of base sidewall 44 contiguous to opening 106, and a hook or C-shaped clamping portion 118 extending from arm 112, which portion is shaped to engage and bias the light toward arms 112 and 113 whereby there will be a frictional clamping engagement between the light 102 and portion 118, as well as arms 112 and 113. It may be easily seen that the simple lens 108 can easily lock itself to the base wall 44 with the snap action engagement of the protuberances 114 and 115 behind the inside wall surface after the lens light receiving portion 110 has been inserted through wall opening 106, and additionally, the lens clamping portion 118 can firmly hold the signal light 102 in its proper position in front of the lens window portion 109 whereby the lens can be readily illuminated by the light. In order for the illumination from light 102 to pass only through its respective lens 108 and not through lens 120, which supports the timer light 104, the base 42 is molded with an integral vertical partition wall 122 which is between the light 102 and control member 82, and, similarly, the base is also molded with an integral partition wall 123 which is adjacent to and limits the illumination from light 104 as can be readily seen in FIG. 3.

To assist in providing electrical power to the percolator 20, the base 42 as seen in FIG. 3 is formed with a somewhat C-shaped wall 125 which supports and spaces two outwardly extending terminal pins or conductors 127 and 128. These terminal pins are of standard construction and are adapted to receive a standard plug which is attached to a cord set having a plug on the other end which is connectable to an electrical power source such as an electrical receptacle normally found within the home. Such a cord set is well known and not shown in the drawing.

In view of the hereinbefore description, the operation of the present percolator may be readily understood in reference to the schematic wiring diagram shown in FIG. 5. To use the preset feature, the percolator 20 is charged by placing water in the vessel 22 and an appropriate amount of coffee grounds in basket 34. Naturally, the cover 36 is positioned on the vessel 22 as depicted in FIG. 1. The user then selects the time at which the brewed coffee is desired and rotates the time setting control member 82 until the indicia 90 is angularly oriented to correspond with the desired time lapse. Since there are only three 15 minute intervals between one and zero, the setting selected compensates for the brewing time, which is approximately 15 minutes. After making this simple adjustment the user merely needs to electrically connect the terminal pins 127 and 128 to an electrical outlet by means of a standard cord set. Referring to the schematical wiring diagram, it should be noted that the switch 95 is depicted in its state wherein the lever contact portion 99 is in engagement with the intermediate member cam notch portion 77 whereas the switch will be in its other condition with the portion 99 engaging the peripheral portion 76 as is the case when using the preset feature. Thus, once power is initially supplied to the terminals, the switch 95 is arranged so that the electrical current passes from terminal pin 127 through lead 129, timer motor 70, lead 130, switch 95, lead 131, thermostatic switch 50, lead 132 and finally to terminal pin 128. Inasmuch as the timer light 104 is wired in parallel with the timing movement 70, it will be illuminated as soon as the timing movement 70 is energized. With this arrangement, the user can note by the timer light lens 120 being illuminated that power is being supplied to the percolator 20 and that the timing movement is operating.

As previously discussed, once electrical energy is supplied to the timing movement 70, its drive shaft 72 rotates at a speed of approximately 1 revolution per 12 hours. Accordingly, the intermediate member 74 rotates, which drives and rotates the time setting control member 82. The timing movement 70 continues to operate until the desired time has elapsed and the intermediate cam notch latch portion 77 is in alignment with the switch lever contact portion 99 causing the lever 98 to move outwardly so that the switch will be actuated to the position shown in the schematic drawing. The actuation of switch 95 opens the circuit with respect to the timing movement 70 stopping the rotation of the intermediate member, and also the signal light 104 is turned off. As may be seen in the sche- matic electric diagram, the active portion of the circuit now comprises terminal pin 127, lead 133, heater 25, lead 134, switch 95, lead 131, thermostat 50, lead 132 and finally terminal pin 128. In this condition the brewing operation is commenced by the energization of the pump well heater 25. The brewing and pumping operation continues until the coffee reaches a selected elevated temperature as determined by the angular disposition of the temperature control knob 54. Once the desired coffee temperature has been reached, the thermostat switch 50 opens so that the current now flows through the auxiliary heater 57 instead of the thermostatic switch 50. The user can visually determine that the brewing operation is underway due to the heated water and coffee gushing into the transparent knob dome portion 39. Inasmuch as the auxiliary heater has a far greater resistance than the main heater 25, the heat produced by the main heater 25 after being placed in series with the auxiliary heater 57 is very small and cannot effectively cause the pumping action forcing heated water and coffee up the delivery tube 32. The primary purpose of the auxiliary heater 57 is to maintain the coffee at a desirable elevated drinking temperature. Since the coffee light 102 is electrically connected in parallel with respect to the auxiliary heater, this light is turned on as soon as the thermostatic switch is open. With this mode of operation, the user has a visual indication that the coffee making operation is completed and the coffee is ready for serving. Therefore, the user can readily determine by simply glancing at the percolator, the particular stage of the percolator operating cycle. That is to say, the user can quickly determine if the timer motor is operating or the brewing operation is underway or the coffee is ready for serving.

Since there are occasions when the presetting feature is not needed, the present percolator can be used without the timing mechanism by simply leaving the timing setting control member 82 so that the indicia 90 is oriented with the zero facing forwardly which locates the intermediate cam notch portion 77 in alignment with the switch lever contact portion 99. When arranged thusly, the percolator operates in a normal manner wherein the connection of electrical power to the terminal pins 127 and 128 immediately activates the pump heater 25 assuming that the thermostatic switch 50 is in its closed position, which naturally is the normal state of the switch at the beginning of a brewing operation.

It should be appreciated by those skilled in the art that the present percolator is constructed to be used as a normal percolator or to use the preset timing feature which is controlled by a single control member 82. Moreover, the internal components disposed within the base are arranged and oriented in a compact manner to consume a minimum of space and at the same time the electrical components are spaced above the base bottom wall so in the event of liquid entering the base, the electrical components will not be positioned in the liquid and the liquid can leave the base through opening 47. Furthermore, the base 42 lends itself to inexpensive manufacturing techniques wherein the timing movement 70, switch 95, intermediate member 74, and control member 82 can be attached to the base as a subassembly prior to being connected to the vessel 22. Therefore, the present percolator, while being very versatile, is still compact and inexpensively manufactured.

While there has been illustrated and described one embodiment of the present invention, it will be obvious to those skilled in the art that various changes and modifications thereof may be made, and it is intended in the appended claims to cover all such changes and modifications as fall within the true spirit and scope of the present invention.

What is considered new and desired to be secured by Letters Patent of the United States is:

1. An electric percolator for brewing coffee having a vessel at the bottom of which is an electric heater pump for heating and lifting water from the bottom of the vessel to a coffee ground basket disposed within the vessel near the top thereof, thermostat means positioned below the vessel and adapted for sensing the temperature of the liquid held within the vessel and for terminating the coffee brewing operation by stopping the pumping of water into the basket wherein the improvement comprises a base enclosing the bottom of said vessel and secured thereto, timing means positioned within said base and attached thereto, manually setting control member rotatably mounted to said base with at least a portion thereof accessible from the outside of said base, said timing means adapted to rotate said member at a uniform speed, switch means mounted within said base and in electrical connection with said electric heater pump for starting the brewing operation by closing the circuit to said electric heater pump, said switch means adapted to be actuated after the lapse of a determinable time which is set by the angular disposition of said member.

2. The electric percolator of claim 1 wherein said switch means is in electrical connection with said timing means which is electrically operated, the actuation of said switch means opens the circuit with respect to said timing means thereby stopping the rotation of said control member.

3. The electric percolator of claim 1 wherein said base is molded from plastic material and has a cup-shaped configuration with a bottom wall, said base molded with a plurality of posts extending upwardly from said bottom wall, said timing means control member and switch means being attached to said posts.

4. In an electric percolator having a vessel at the bottom of which is an electric heater for brewing coffee, a thermostatic switch for controlling the coffee temperature at which the coffee brewing operation is terminated, and a base secured to the bottom of said vessel with electric connector means attached thereto wherein the improvement comprises a control member attached to said base and being accessible from outside of said base for setting the desired length of time before the start of brewing operation, electric timer means connected to said control member for timing the duration of time before the start of the brewing operation, an electrical control switch positioned within said base in electrical connection with said heater and disposed for actuation due to the operation of said timer means, circuit means connecting a first signal light in said base, a second signal light in said base, said heater, said thermostatic switch, said connector means, said timer means and said control switch and arranged so that said first signal light is turned on when said connector means is connected to an electrical energy source and is turned off when said control switch is actuated, said second signal light arranged so that it is turned on when said thermostatic switch is opened at the end of the brewing operation.

5. In the percolator of claim 4 wherein said signal lights are held by said base so that one is on each side of said control member.

6. In the percolator of claim 4 including a knob connected to said thermostatic switch for varying the temperature setting thereof, said knob rotatably supported by said base above said control member.

7. In the percolator of claim 4 wherein said circuit means provides that electrical power is interrupted to said timer means when said switch is actuated.

8. In the percolator of claim 4 including a cover having a transparent portion positioned on top of said vessel, said cover portion disposed so that the pulsating action of the coffee brewing is readily visible whereby said first light can indicate when said percolator is initially connected to an electric power source, said cover portion indicates the brewing operation and said second light indicates the completion of the brewing operation.

9. In an electric percolator having an electric main heater for brewing coffee, an electric thermostatic switch for terminating the completion of the brewing operation, circuit means including said main heater, said switch and a connector means, wherein the improvement comprises a first signal light in said circuit means which can visually indicate when said connector means is connected to an electric power source, electric timing means for starting the brewing operation at a selectable time after said connector means is connected to a power source, said first signal means being connected in parallel with said timing means, second signal light in said circuit means which is turned on when said thermostatic switch is opened to visually indicate the completion of the brewing operation, and an auxiliary heater for keeping the brewed coffee warm after the completion of the brewing operation, said second signal light being connected in parallel with said auxiliary heater.

10. In the electric percolator of claim 9 wherein with the normal operation of said percolator said first signal light is turned off before said second signal light is turned on.

11. An electric percolator for brewing coffee comprising heater means secured to a vessel, a cup-shaped base enclosing said heater means and attached to said vessel near its bottom, said base defining a horizontally extending opening through which extends a member which is rotatably mounted to a post integrally formed with said base, timing means secured to said base and in driving relationship with said member for rotating same at a constant speed, switch means attached to at least one boss integrally formed with said base and in electrical connection with said heater means, said member being angularly settable so that the rotation thereof by said timing means can actuate said switch after the lapse of a selectable time.

12. The electric percolator of claim 11 wherein said member is disposed below said heater means, said timing means positioned below said member and said switch means located above said timing means.

13. In an electric percolator having an electric heater for brewing coffee and a base enclosing said heater comprising timer means disposed in said base, a control member for setting the length of time before said heater is energized projecting through the periphery of said base, an intermediate member drivingly connecting said control member to said timer means so that said timer means can move said members, a switch in electrical connection with said heater for initiating the brewing operation disposed in said base so that it can be actuated by one of said members after the lapse of a selectable time governed by the setting of said control member.

14. In the electric percolator of claim 13 wherein said control member has a circular configuration and indicia near the periphery thereof signifying time periods to facilitate the setting of said member.

15. In the electric percolator of claim 14 wherein said control member is molded from plastic material and has integral gear teeth, said intermediate member formed with complementary gear teeth for drivingly engaging said control member teeth whereby the rotation of one member rotates the other member.

16. In the electric percolator of claim 15 wherein said intermediate member is formed with cam means for cooperating with said switch whereby the rotation of said intermediate member can actuate said switch.

17. In an electric percolator for brewing coffee comprising a vessel having an electric heater attached to its bottom, a base secured to and enclosing the bottom of said vessel, said base defining a horizontally extending opening through which projects a control wheel which is rotatably mounted to said base, timing means secured to said base and having a drive shaft, cam means attached to said shaft and in driving engagement with said control wheel so that said timing means can rotate said control wheel at a constant speed, switch means supported by said base and disposed for actuation by said cam means, said switch being in electrical connection with said heater whereby said control wheel can be angularly set so that said switch means can permit said heater to receive electrical energy after the lapse of a selectable time.

18. In the electric percolator of claim 17 wherein said base has a cup-shaped configuration with a bottom wall defining egression means for permitting liquid which might enter said base to flow out thereof through said egression means, said timing means and said switch means attached to said base so that they are spaced upwardly from said bottom wall.